May 8, 1951    J. B. RUATTI    2,551,968
CARRIAGE RELEASE FOR LATHES
Filed Aug. 19, 1948

INVENTOR,
JOSEPH B. RUATTI.
BY
Hazard & Miller
ATTORNEYS

Patented May 8, 1951

2,551,968

UNITED STATES PATENT OFFICE 2,551,968

CARRIAGE RELEASE FOR LATHES

Joseph B. Ruatti, Los Angeles, Calif.

Application August 19, 1948, Serial No. 45,075

5 Claims. (Cl. 82—21)

This invention relates to a carriage release for machine lathes.

A primary object of the invention is to provide a device which is readily applicable to most conventional forms of lathe which will enable stops to be set at any desired positions along the length of the lathe bed and which when engaged will automatically effect a release of the driving connection between the carriage and the lead screw in either direction so that regardless of the direction in which the carriage may be propelled by the lead screw an automatic stopping of the carriage may be effected.

More specifically, an object of the invention is to provide a construction applicable to the carriage of a lathe consisting of a driven gear segment applicable to the lead screw release crank on the carriage, the gear segment being in mesh with a driving gear which is spring propelled. A novel and simple means is effective to temporarily lock the driving gear against rotation under the effect of the spring so that when the crank is swung into a position to effect an engagement with the lead screw, it will be effectively locked in this position until such time as a stop may be engaged and then be forcibly rotated by the spring to lead screw releasing position.

With the foregoing and other objects in view, which will be made manifest in the following detailed description and specifically pointed out in the appended claims, reference is had to the accompanying drawings for an illustrative embodiment of the invention, wherein:

Figure 1:
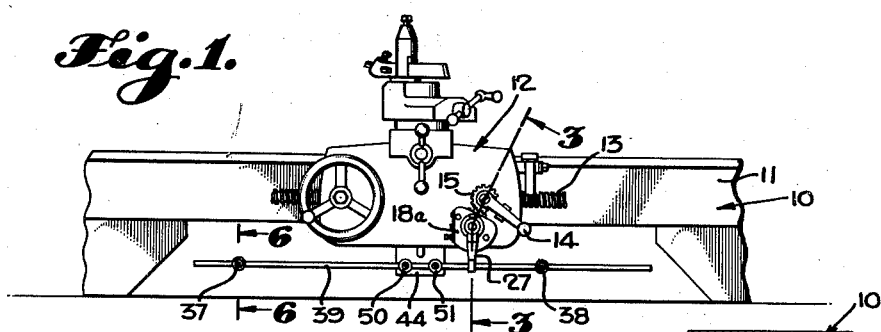
Figure 1 is a view in front elevation of a portion of a lathe illustrating the mechanism embodying the present invention as having been applied to its carriage.
Figures 3, 5:
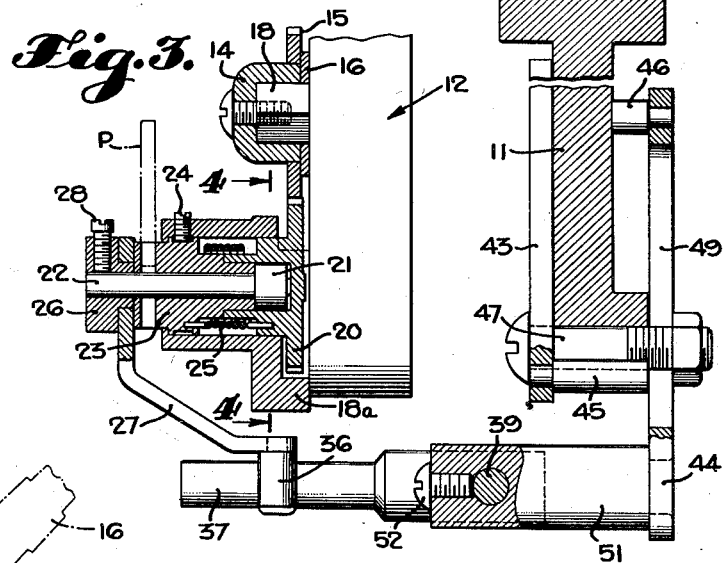
Fig. 3 is a sectional view taken substantially upon the line 3—3 upon Fig. 1 in the direction indicated.
Fig. 5 is a sectional view taken substantially upon the line 5—5 upon Fig. 4.

Referring to the accompanying drawings wherein similar reference characters designate similar parts throughout, 10 indicates generally a lathe bed having rails 11 over which a carriage 12 is movable. 13 indicates the lead screw of the lathe to which the carriage may be optionally connected so as to be propelled thereby along the length of the lathe bed. Various types of devices are utilized for effecting a connection or disconnection between the carriage and the lead screw but in the usual lathe whatever mechanism is employed it is controlled and operated by a crank 14 rotatably disposed on the forward side of the carriage. In some constructions of lathes the crank 14 swings downwardly through approximately a ninety degree arc to effect engagement between the carriage and the lead screw and on swinging the crank upwardly through the same arc a release of the connection between the carriage and the lead screw is accomplished. In other forms of lathe the movement of the crank is reversed, namely, upward swinging movement of the crank effects a connection with the lead screw and downward swinging movement accomplishes the disconnection. The present invention is applicable to either lathe or to other types of machine tools where similar or analogous conditions exist.

The present invention comprises a gear segment 15 which has an arm 16 rigid therewith with forwardly extending lips 17 integral therewith adapted to embrace the sides of the crank 14. In applying this segment to the carriage of the lathe it is merely necessary to remove the crank 14 from the rotary shaft 18 on which it is mounted, slip the gear segment on the rotary shaft and reapply the crank in such a position that it will fit between the lips 17. The gear segment 15 constitutes a driven gear segment and when driven it may swing the crank 14 from the full line position shown in Fig. 2 to the dotted line position shown therein.

A housing 18a is provided which is adapted to be secured to the carriage 12 such as by cap screws 19. In applying this housing to the carriage it usually is necessary to drill and tap two holes designed to receive the cap screws 19. Within the housing there is rotatably fitted a driving gear 20 which meshes with the gear segment 15. The hub of this driving gear is cylindrically recessed to receive a generally cylindrical cam 21 having a stem 22 integral therewith. A closure 23 closes the outer end of the housing and is adjustably held in position with relation to the housing by means of a set screw 24. This closure provides an anchoring means for one end of a torsion spring 25, the other end of which is anchored in the driving gear 20. The closure may be rotatably adjusted with relation to the housing by inserting a pin P in one of the holes formed therein and rotating the closure thereby to impose an initial tension on the spring 25. When in adjusted position it is locked therein by tightening the set screw 24. At the outer end of the closure 23 there is a cap 26 having a square or polygonal inner end adapted to receive an arm 27. This cap is retained on the stem 22 by means of a set screw 28 it being understood that the cam 21 is effectively confined within the driving gear 20 by means of the closure 23.

Figures 2, 4:
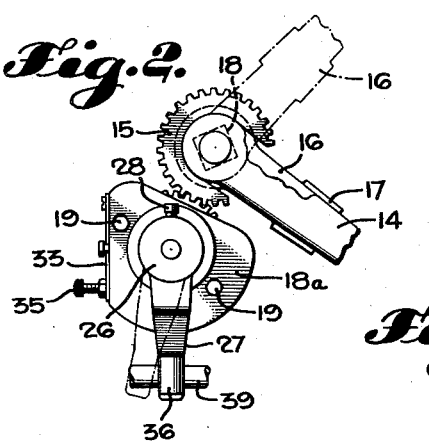
Fig. 2 is a view in front elevation on an enlarged scale a portion of the device illustrated in Fig. 1.
Fig. 4 is a vertical section taken substantially upon the line 4—4 upon Fig. 3.
Figure 6:
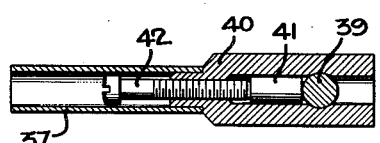
Fig. 6 is a sectional view taken substantially upon the line 6—6 upon Fig. 1.

A cam follower 29 is slidable radially through the wall of the hub of the driving gear 20 and has a length substantially equal to the wall thickness of the hub of the driving gear as shown in Fig. 4. The radial aperture in which the cam follower is disposed is indicated at 30 and is adapted to move into or out of registration with an aperture 31 in the housing 18. The aperture 31 contains a locking pin 32 of such a size that it may enter the aperture 30 in the hub of the driving gear 20, as shown in Fig. 4, the locking pin is normally urged into this position by means of a leaf spring 33 secured to the side of the housing such as by a screw 34 but it may be held in a retracting position such as that indicated on dotted lines in Fig. 4 by screwing a thumb screw 35 therethrough against the side of the housing.

The arm 27 carries a roller 36 which is engageable with either of a plurality of stops indicated at 37 and 38 which are adjustable along the length of a rod 39 that is arranged parallel to the lathe bed. These stops may be of any preferred construction but are illustrated as consisting merely of tubular members 40 through which the rod 39 extends. They are held in any adjusted position along the length of the rod by tightening shoes 41 against the rod by means of screws 42. The forward ends of these tubular members are arranged in the path of the roller 36.

The rod 39 is supported on the lathe bed by any suitable type of rod support such as two opposed plates 43 and 44. The plate 43 is adapted to be positioned against the forward side of the forward rail 11 and carries a pair of horizontally aligned studs 45. The plate 44 carries a similar stud 46 engageable with the rear side of the rail 11 and a bolt 47 tightens the two plates into clamping engagement with the rail. A vertical slot 49 in the plate 44 permits of vertical adjustment of the plate 44 with relation to the plate 43 and in relation to the rail 11 and the carriage 12. The plate 44 carries a pair of forwardly extending studs 50 and 51 through which the rod 39 slidably extends. It is held in any adjusted position by means of screws 52.

The operation of the above described construction is substantially as follows. Assuming the lathe to have a crank 14 which swings downwardly to effect an engagement with the lead screw 13 downward swinging movement of the crank 14 causes the driven gear segment 15 to rotate therewith. This gear segment in turn rotates the driving gear 20 winding up the torsion spring 25. At the time that the crank 14 is in its lowermost position apertures 30 and 31 come into alignment with each other and relief spring 33 is effective to press the locking pin 32 inwardly to enter aperture 30 which is the inner end of the cam follower 29 to enter the notch in the cam 21. The entry of the locking pin 32 in the aperture 30 in the hub of the driving gear 20 temporarily locks the driving gear against rotation by the wound up torsion spring 25. Consequently, the crank 14 will remain in its lowermost position wherein the lead screw 13 is engaged and the carriage 12 will be effectively driven or propelled along the lathe bed by the lead screw until such time as the stop 37 or the stop 38 is engaged. If one of these stops is engaged by the roller 36 on the arm 27 the cap 26 and the stem 22 will be turned thereby. The turning of the stem 22 effects a rotation of the cam 21 forcing the cam follower 29 outwardly in the aperture 30. The cam follower in turn forces the locking pin 32 out of the aperture 30 thus freeing or releasing the driving gear 20 so that it may be rotated by the wound torsion spring 25. Rotation of the driving gear 20 causes the driven gear segment 15 to be rotated thereby thus swinging the release crank 14 from its lowermost position to its uppermost position and effecting a release of the carriage 12 from the lead screw 13. Thus, when either stop 37 or 38 is engaged by the roller 36 the carriage will be immediately and automatically disconnected from the lead screw and allowed to stop with relation to the lathe bed.

If the construction of the lathe is such that the release crank 14 swings downwardly to release the carriage from the lead screw instead of upwardly as previously described the construction employed is the same with the exception that a reversely wound torsion spring 25 may have to be substituted for the torsion spring shown to urge the driving gear 20 in the opposite direction and consequently accomplish a swinging of the crank 14 in the opposite direction.

If, at any time, it is desired to render the construction nonoperable this is accomplished by merely screwing the thumb screw 35 through the leaf spring and against the housing 18 causing the leaf spring to shift to the dotted line position shown in Fig. 4 and holding the locking pin 32 in retracted position against entry in the aperture 30. Under these conditions, swinging of the crank 14 will drive the gear segment 15 and the gear 20 but as the locking pin 32 is held out of aperture 30 the driving gear is at all times released. Consequently, crank 14 under these circumstances can be manually shifted to remain at screw engaging or disengaging position at will without waiting for one of the stops 37 or 38 to be engaged.

It will be appreciated that the rod 39 can be conveniently mounted on any conventional lathe and that the stops 37 and 38 can be adjusted thereon to limit the travel of the carriage to any desired length.

From the above described construction it will be appreciated that a highly simple and advantageous carriage release for lathes has been provided which will automatically effect a stopping of the carriage at either end of a selected length of travel. The construction is applicable to any type of conventional lathe without requiring any serious modification of the lathe. The housing 18 and its associated structure can be applied to the carriage by merely drilling and tapping two holes in the carriage to receive the fastening screws 19.

It is obvious that if the arm 27 with its roller 36 will effect a release when shifted in either direction that it is desired to stop the carriage at any intermediate position between the stops 37 and 38 that this can be instantly accomplished by manually swinging the arm 27 in either direction.

Various changes may be made in the details of construction without departing from the spirit and scope of the invention as defined by the appended claims.

I claim:

1. A device of the class described comprising a driven gear segment applicable to the lead screw release crank of a lathe carriage, a driving segment arranged to mesh therewith, a cam rotatable in the driving segment, a cam follower slidable in the driving segment, means actuated by the cam follower for locking and unlocking the driving segment, spring means urging the driving segment to rotate the driven gear segment and thus operate the release crank, stop means applicable to the lathe, and means on the cam engageable with the stop means to actuate the cam when the stop means is engaged thereby.

2. A device of the class described comprising a driven gear applicable to the lead screw release crank of a lathe carriage, a driving gear arranged to mesh therewith, a cam rotatable in the driving gear, a cam follower slidable in the driving gear, a locking pin arranged to enter the driving gear in back of the cam follower for locking and unlocking the driving gear, spring means urging the driving gear to rotate the driven gear segment and thus operate the release crank, stop means applicable to the lathe, and means on the cam engageable with the stop means to actuate the cam when the stop means is engaged thereby.

3. A device of the class described comprising a driven gear applicable to the lead screw release crank of a lathe carriage, a driving gear arranged to mesh therewith, a cam rotatable in the driving gear, a cam follower slidable in the driving gear, a locking pin arranged to enter the driving gear in back of the cam follower for locking and unlocking the driving gear, spring means urging the driving gear to rotate the driven gear segment and thus operate the release crank, stop means applicable to the lathe, means on the cam engageable with the stop means to actuate the cam when the stop means is engaged thereby, and means for urging the locking pin into a position for locking the driving gear against rotation.

4. A device of the class described comprising a driven gear applicable to the lead screw release crank of a lathe carriage, a driving gear arranged to mesh therewith, a cam rotatable in the driving gear, a cam follower slidable in the driving gear, a locking pin arranged to enter the driving gear in back of the cam follower for locking and unlocking the driving gear, spring means urging the driving gear to rotate the driven gear segment and thus operate the release crank, stop means applicable to the lathe, means on the cam engageable with the stop means to actuate the cam when the stop means is engaged thereby, means for urging the locking pin into a position for locking the driving gear against rotation, and means for rendering the last mentioned means inoperative.

5. A device of the class described comprising a driven gear segment applicable to the lead screw release crank of a lathe carriage, a driving gear adapted to mesh therewith, spring means associated with the driving gear adapted to be stressed thereby when the release crank is swung into lead screw-engaging position to cause the driving gear to urge the release crank to return to releasing position, means for releasably locking the driving gear against rotation under the influence of the spring means, stop means applicable to the lathe, and means adapted to be mounted on the lathe engageable with the stop means to effect a release of the locking means whereby the spring means can be effective to rotate the driving gear and thus shift the release crank to release position.

JOSEPH B. RUATTI.

REFERENCES CITED

The following references are of record in the file of this patent:

UNITED STATES PATENTS

| Number | Name | Date |
| --- | --- | --- |
| 193,850 | Cooley | Aug. 7, 1877 |
| 2,101,754 | Randall | Dec. 7, 1937 |
| 2,154,915 | Ohera | Apr. 18, 1939 |

FOREIGN PATENTS

| Number | Country | Date |
| --- | --- | --- |
| 27,652 | Denmark | May 9, 1921 |